(12) United States Patent
Smith et al.

(10) Patent No.: US 7,377,966 B2
(45) Date of Patent: *May 27, 2008

(54) ADSORPTIVE ASSEMBLY AND METHOD OF MAKING THE SAME

(75) Inventors: Robert L. Smith, Rudolph, OH (US); Gary B. Zulauf, Findlay, OH (US)

(73) Assignee: Honeywell International, Inc., Morristown, NJ (US)

( * ) Notice: Subject to any disclaimer, the term of this patent is extended or adjusted under 35 U.S.C. 154(b) by 258 days.

This patent is subject to a terminal disclaimer.

(21) Appl. No.: 10/927,383

(22) Filed: Aug. 26, 2004

(65) Prior Publication Data

US 2006/0042468 A1 Mar. 2, 2006

(51) Int. Cl.
*B01D 53/02* (2006.01)

(52) U.S. Cl. .................. 96/154; 96/134; 96/147; 55/512; 55/515

(58) Field of Classification Search .............. 96/154, 96/134, 135, 147; 55/512, 515–516, 509, 55/519; 123/519, 509
See application file for complete search history.

(56) References Cited

U.S. PATENT DOCUMENTS

| | | | |
|---|---|---|---|
| 2,201,628 A | 5/1940 | McCormick et al. |
| 2,922,418 A | 1/1960 | Heffernan et al. |
| 3,093,124 A | 6/1963 | Wentworth |
| 3,191,587 A | 6/1965 | Hall |
| 3,352,294 A | 11/1967 | Skarstrom et al. |
| 3,368,326 A | 2/1968 | Hervert |
| 3,393,669 A | 7/1968 | Vardi et al. |
| RE26,530 E | 3/1969 | Wentworth |
| 3,540,423 A | 11/1970 | Tolles |
| 3,541,765 A | 11/1970 | Adler et al. |
| 3,563,007 A | 2/1971 | Clarke |
| 3,572,013 A | 3/1971 | Hansen |
| 3,572,014 A | 3/1971 | Hansen |

(Continued)

FOREIGN PATENT DOCUMENTS

DE 250469 A1 6/1986

(Continued)

OTHER PUBLICATIONS http://aiche.confex.com/aiche/2005/preliminaryprogram/abstract_17077.htm.*

(Continued)

*Primary Examiner*—Duane Smith
*Assistant Examiner*—Ives Wu

(57) ABSTRACT

An adsorptive filter/member for adsorbing a gaseous adsorbate. The filter includes two layers of a flexible polymeric material to form an area therebetween. Fasteners are located at predetermined areas across the two layer outer surfaces, the fasteners extending from the outer surface of one layer to the outer surface of the other layer. The fasteners subdivide the area into a plurality of substantially enclosed chambers. Adsorptive media is disposed within each of the plurality of chambers. The chambers are adapted to substantially evenly distribute adsorptive media throughout the filter. Throughbores extend through the filter, and receive attachment members for mounting the filter to a surface. A gaseous adsorbate flow path is in gaseous communication with one of the outer surfaces of the two layers. Each of the two layers' polymeric materials includes pores that are permeable to the gaseous adsorbate, yet are substantially impermeable to the adsorptive media.

21 Claims, 4 Drawing Sheets

U.S. PATENT DOCUMENTS

| | | |
|---|---|---|
| 3,646,731 A | 3/1972 | Hansen |
| 3,678,663 A | 7/1972 | Hansen |
| 4,085,721 A | 4/1978 | Vardi et al. |
| 4,136,650 A | 1/1979 | Manookian, Jr. |
| 4,217,386 A | 8/1980 | Arons et al. |
| 4,250,172 A * | 2/1981 | Mutzenberg et al. .......... 442/6 |
| 4,261,717 A | 4/1981 | Belore et al. |
| 4,279,630 A | 7/1981 | Nakamura et al. |
| 4,401,447 A | 8/1983 | Huber |
| 4,409,950 A | 10/1983 | Goldberg |
| 4,418,662 A | 12/1983 | Engler et al. |
| 4,513,047 A | 4/1985 | Leach et al. |
| 4,913,942 A * | 4/1990 | Jick ........................... 96/121 |
| 4,925,468 A | 5/1990 | Kishi et al. |
| 5,076,821 A | 12/1991 | Bruhnke et al. |
| 5,087,273 A * | 2/1992 | Ward ........................... 96/147 |
| 5,129,929 A | 7/1992 | Linnersten |
| 5,207,808 A | 5/1993 | Haruta et al. |
| 5,354,365 A | 10/1994 | Youn |
| 5,466,516 A | 11/1995 | Lutzow et al. |
| 5,486,410 A | 1/1996 | Groeger et al. |
| 5,609,761 A | 3/1997 | Franz |
| 5,620,505 A | 4/1997 | Koch et al. |
| 5,722,358 A | 3/1998 | Fuesser et al. |
| 5,879,423 A | 3/1999 | Luka et al. |
| 5,912,368 A | 6/1999 | Satarino et al. |
| 6,152,996 A | 11/2000 | Linnersten et al. |
| 6,200,368 B1 | 3/2001 | Guerin et al. |
| 6,374,811 B1 | 4/2002 | Mancini |
| 6,383,268 B2 | 5/2002 | Oda |
| 6,402,811 B1 * | 6/2002 | Shanks et al. .................. 95/90 |
| 6,432,179 B1 | 8/2002 | Lobovsky et al. |
| 6,438,486 B1 | 8/2002 | Mancini |
| 6,440,200 B1 | 8/2002 | Sakakibara et al. |
| 6,464,761 B1 | 10/2002 | Bugli |
| 6,474,312 B1 | 11/2002 | Zulauf et al. |
| 6,505,610 B2 | 1/2003 | Everingham et al. |
| 6,565,627 B1 | 5/2003 | Golden et al. |
| 6,592,655 B2 | 7/2003 | Iriyama et al. |
| 6,637,415 B2 | 10/2003 | Yoshioka et al. |
| 6,679,228 B1 | 1/2004 | Confer et al. |
| 6,692,551 B2 | 2/2004 | Wernholm et al. |
| 6,692,554 B1 | 2/2004 | Leffel et al. |
| 6,692,555 B2 | 2/2004 | Oda et al. |
| 6,698,403 B2 | 3/2004 | Honda et al. |
| 6,699,310 B2 | 3/2004 | Oda et al. |
| 6,752,859 B2 | 6/2004 | LaBarge et al. |
| 6,955,376 B1 * | 10/2005 | Labrie et al. ............. 280/728.3 |
| 7,115,199 B2 * | 10/2006 | Simonson ................... 210/232 |
| 2002/0029693 A1 | 3/2002 | Sakakibara et al. |
| 2002/0059920 A1 | 5/2002 | Yoshioka et al. |
| 2002/0083838 A1 | 7/2002 | Incorvia et al. |
| 2003/0116021 A1 | 6/2003 | Oda et al. |
| 2003/0145726 A1 | 8/2003 | Gueret et al. |
| 2003/0145732 A1 | 8/2003 | Leffel et al. |
| 2003/0183083 A1 | 10/2003 | Hau-Cheng Fu et al. |
| 2003/0192512 A1 | 10/2003 | Luley et al. |
| 2003/0196644 A1 | 10/2003 | Braun et al. |
| 2003/0229476 A1 * | 12/2003 | Naganarayana et al. ....... 703/1 |
| 2004/0011197 A1 | 1/2004 | Wernholm et al. |
| 2004/0050252 A1 | 3/2004 | Wernholm et al. |
| 2004/0065197 A1 | 4/2004 | LaBarge et al. |
| 2004/0079344 A1 | 4/2004 | Gimby et al. |
| 2004/0083894 A1 | 5/2004 | Koyama et al. |
| 2005/0081712 A1 | 4/2005 | Koslow ......................... 95/90 |
| 2005/0145224 A1 * | 7/2005 | Zulauf et al. ............... 123/518 |

FOREIGN PATENT DOCUMENTS

| | | |
|---|---|---|
| DE | 101 02 604 | 7/2002 |
| EP | 1 273 789 | 1/2003 |
| JP | 405253439 | 10/1993 |

OTHER PUBLICATIONS http://aiche.confex.com/aiche/2005/preliminaryprogram/abstract_17077.htm.*

International Search Report for PCT/US2005/030779 dated Jul. 13, 2006.

Written Opinion of the International Searching Authority for PCT/US2005/030779 dated Jul. 13, 2006.

Written Opinion of the International Searching Authority for PCT/US2004/008031 dated Aug. 19, 2004 International Search Report for PCT/US2005/008031 dated Aug. 19, 2004.

International Search Report for S.N. PCT/US2004/008031 dated Aug. 19, 2004 (12 pages).

Office Action dated May 1, 2007 for U.S. Appl. No. 10/978,923, filed Nov. 1, 2004.

* cited by examiner

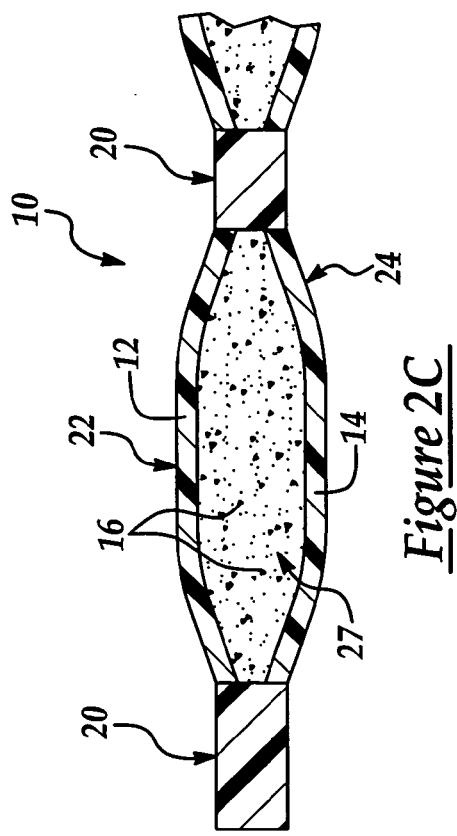
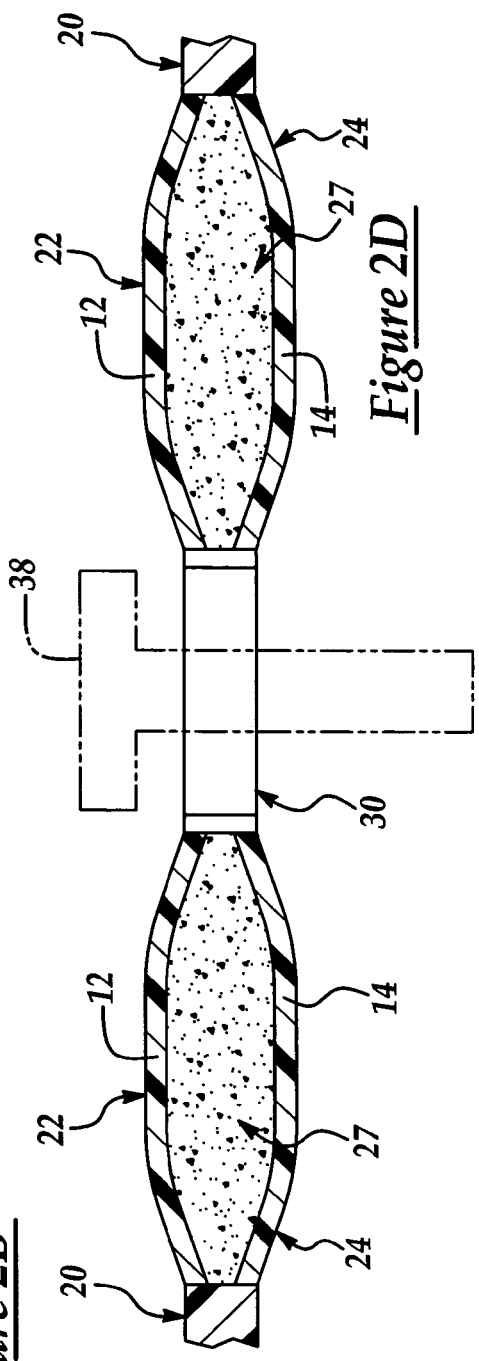

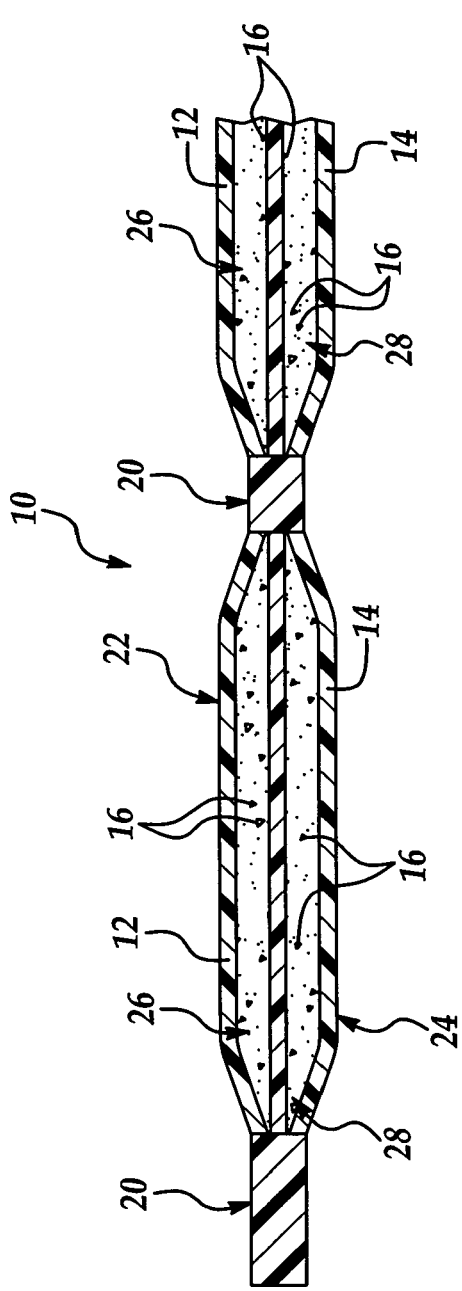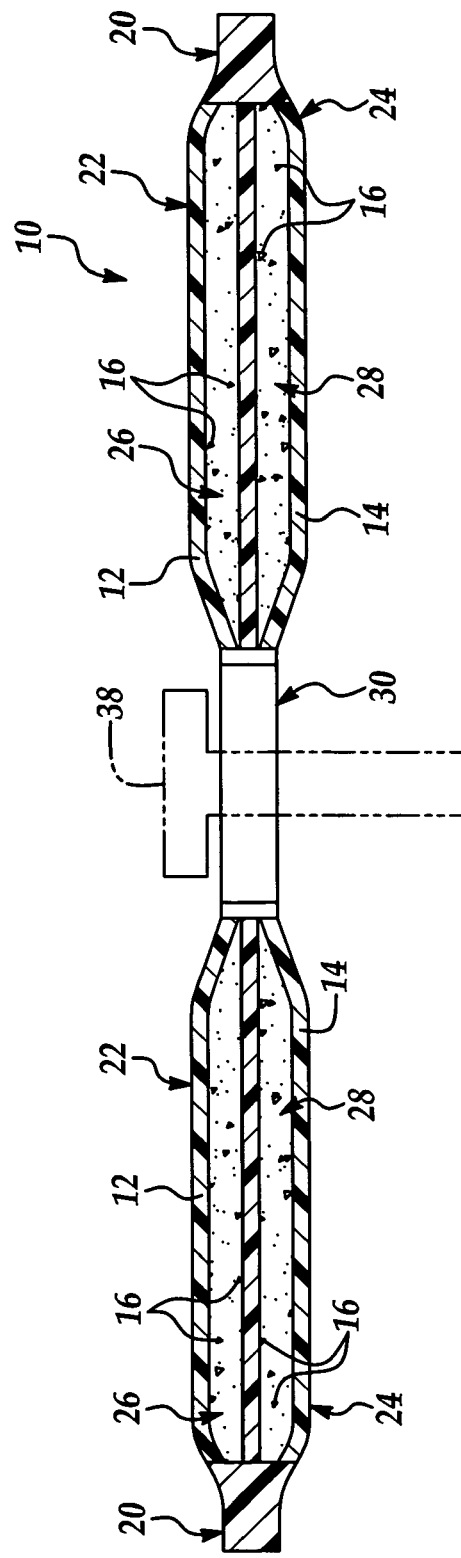

ADSORPTIVE ASSEMBLY AND METHOD OF MAKING THE SAME

BACKGROUND

Embodiments of the present invention relate generally to adsorptive members, and more particularly to adsorptive filters useful for adsorbing gaseous materials.

Various filters have been produced for adsorbing gaseous materials. Many of these filters were incorporated into frames in order to be mounted in a desired area. Such incorporation may, in some instances, add undesirable weight to the filter and/or render the filter difficult to fit into the desired area, especially if the area were of an irregular shape.

Other filters have included combining gaseous-adsorbing materials with a standard particulate/contaminant air filter. Some drawbacks associated with these combination filters include the possibility of gaseous-adsorbing material flaking out of the filter and undesirably entering the surrounding environment. Further, this loss of adsorbent material may deleteriously affect the capacity of the filter.

Further, other filters have binders added to the adsorptive material. These binders may, in some instances, poison and/or otherwise deleteriously affect the adsorptive material, thus reducing the material's available surface area for adsorption.

Still further, other filters have included relatively large amounts of adsorptive material, while such adsorptive materials undesirably have a relatively small available surface area for adsorption.

As such, it would be desirable to provide a lightweight, high capacity adsorbent filter which is flexible enough to fit into various desired areas.

SUMMARY

Embodiments of the present invention substantially solve the drawbacks enumerated above by providing an adsorptive filter for adsorbing a desired gaseous adsorbate. The filter includes a first layer of a flexible polymeric material having an outer surface and a second layer of a flexible polymeric material having an outer surface. The second layer is spaced from the first layer to form an area between the first and second layers. A plurality of fasteners is located at predetermined areas across the first and second layer outer surfaces, the plurality of fasteners extending from the outer surface of the first layer to the outer surface of the second layer, wherein the plurality of fasteners subdivides the area into a plurality of substantially enclosed chambers. A predetermined amount of adsorptive media is disposed within each of the plurality of substantially enclosed chambers, and the plurality of substantially enclosed chambers is adapted to substantially evenly distribute the adsorptive media 16 throughout the filter. A plurality of throughbores extends from the outer surface of the first layer to the outer surface of the second layer, and is adapted to receive attachment members for mounting the filter to a desired surface. A gaseous adsorbate flow path is in gaseous communication with one of the outer surfaces of the first and second layers. Each of the first and second layer polymeric materials has pores that are permeable to the desired gaseous adsorbate, yet each of the first and second layer polymeric materials' pores are substantially impermeable to the adsorptive media.

BRIEF DESCRIPTION OF THE DRAWINGS

Objects, features and advantages will become apparent by reference to the following detailed description and drawings, in which like reference numerals correspond to similar, though not necessarily identical components. For the sake of brevity, reference numerals having a previously described function may not necessarily be described in connection with subsequent drawings in which they appear.

FIG. 2A is a cross-sectional view showing first and second layers of polymeric materials;

FIG. 2B is a cross-sectional view showing adsorptive media between the first and second layers;

FIG. 2C is a cross-sectional view showing an embodiment of fasteners in place;

FIG. 2D is a cross-sectional view showing a mounting throughbore;

FIG. 3D is a cross-sectional view showing an embodiment of fasteners in place;

FIG. 3E is a cross-sectional view showing a mounting throughbore; and

DETAILED DESCRIPTION OF THE EMBODIMENTS

The present inventors have unexpectedly and fortuitously discovered an adsorptive filter/member and method of making and using the same which decreases the amount of adsorptive media conventionally used, while increasing the adsorptive media's surface area that is exposed to a desired gaseous adsorbate. Without being bound to any theory, it is believed that this may advantageously increase the probability of the adsorptive media's interaction with, and capture of the desired gaseous adsorbate.

In an embodiment, the adsorptive filter/member includes a plurality of chambers adapted to substantially evenly distribute the adsorptive media throughout the filter at a substantially uniform thickness. It is to be understood that the substantially uniform thickness may be relatively thin in order to maximize the surface area of adsorptive media utilized in capturing the desired adsorbate. Without being bound to any theory, it is believed that the chambers may also provide substantially enhanced suspension for the adsorptive media to substantially prevent the media from undesirably agglomerating within the filter.

In an alternate embodiment, the adsorptive filter/member includes an intermediate layer that substantially adds rigidity to the filter.

Further, embodiments of the adsorptive filter/member may advantageously have sufficient flexibility to ease installation of the filter while maintaining sufficient rigidity to substantially obviate the need for a screen mesh and/or frame-like member. This may advantageously reduce the need for additional materials, and thus may result in a decrease in filter weight, as well as a decrease in manufacturing time and/or cost.

Figure 1:
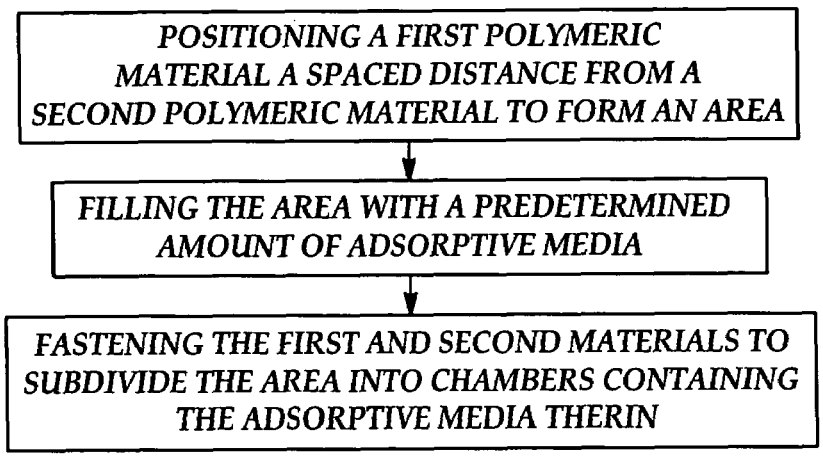
FIG. 1 is a process flow diagram depicting embodiments of the method of forming the adsorptive filter.

Referring now to FIG. 1, an embodiment of the method of making an adsorptive filter/member is depicted. Generally, the method includes positioning a first polymeric material a spaced distance from a second polymeric material to form an area disposed between the first material and the second material. The area may be filled with a predetermined amount of an adsorptive media. The first and second materials are then fastened together, so as to subdivide the area into a plurality of substantially enclosed chambers. As used herein, "substantially enclosed" is intended to mean that the adsorptive media is substantially maintained within the chambers. Embodiments of the filter/member and method will be discussed in further detail hereinbelow in reference to FIGS. 2A-2D, FIGS. 3A-3E, and FIG. 4.

FIGS. 2A-2D together represent a process flow depicting an embodiment of the method of forming an adsorptive filter/member 10 (as depicted in FIGS. 2C and 2D).

Specifically referring to FIG. 2A, a first layer 12 of polymeric material (referred to herein as "first layer" or "first material") is positioned a spaced distance from (e.g. in an overlying relationship with) a second layer 14 of polymeric material (referred to herein as "second layer" or "second material"). The first and second layers 12, 14 of polymeric material may be a natural material, a synthetic material, and/or a mixture of natural and synthetic materials. It is to be understood that any polymeric material that is capable of being formed as a porous material may be used. In an embodiment, the polymeric material is extruded into fibers which are woven. In an alternate embodiment, the polymeric material is a porous non-woven material. The first and second layers 12, 14 may be the same, similar, or different materials. However, it is desirable that the polymeric materials be chemically similar enough to be fastened together, if such fastening is accomplished by other than a mechanical means.

Generally, the porous polymeric materials for the first and second layers 12, 14 are configured to have a pore size/mesh size large enough to allow the desired adsorbate to pass through, yet small enough to prevent the adsorptive media from passing through. In an embodiment, the porous polymeric materials' pore size may range, for example, between about 1 μm and about 2000 μm. In a further embodiment when an adsorptive media having a relatively large average particle size is used (e.g. carbon pellets), the porous polymeric materials' pore size may range, for example, between about 200 μm and about 2000 μm. In yet a further embodiment in which an adsorptive media having a smaller average particle size is used (e.g. granular carbon), the porous polymeric materials' pore size may range, for example, between about 100 μm and about 200 μm. In still a further embodiment in which an adsorptive media having a relatively fine average particle size is used (e.g. powdered carbon), the porous polymeric materials' pore size may range, for example, between about 1 μm and about 100 μm.

It is to be understood that any suitable porous polymeric material may be used that is substantially permeable to the desired adsorbate, yet substantially impermeable to the adsorptive media. Some non-limiting examples of suitable polymeric materials include, but are not limited to polyesters, polypropylenes, vinyl copolymers, polycarbonate, acetal, polyvinyl chloride, polyamides, and/or mixtures thereof. It is to be understood that the layers 12, 14 may have any suitable thickness. In an embodiment, the thickness of each of the layers 12, 14 may range between about 0.007 inch (177.8 μm) and about 0.014 inch (355.6 μm).

As depicted in FIG. 2A, an area 13 is formed between the first and second layers 12, 14. It is to be understood that the thickness of the area 13 may be dependent on, among other factors, the positioning of the first and second layers 12, 14. In an embodiment, the thickness of the area 13 ranges between about 0.016 inch (406.4 μm) and about 0.24 inch (6,096 μm).

Referring now to FIG. 2B, the area 13 may be adapted to be filled with a predetermined amount of adsorptive media 16. It is to be understood that numerous factors may be taken into consideration when determining the amount of the adsorptive media 16 that should be used. These factors include, but are not limited to the amount of adsorbate that is desired to be adsorbed, the adsorptive capacity of the adsorptive media 16, the thickness and length of the area 13, the particle size of the adsorptive media 16, and the amount of adsorptive media 16 that is desired in the area 13 upon fastening of the filter 10 (see FIGS. 2C and 2D). In a non-limiting example, the thickness of the adsorptive media 16 is about 0.06 inch (1,524 μm).

Examples of suitable materials for the adsorptive media 16 include, but are not limited to carbon-based materials, zeolites, aluminum silicates, silica gels, cyclodextrins, silicone, and/or mixtures thereof. It is to be understood that of the materials listed, carbon-based materials may have the highest adsorptive capacity. A non-limitative example of a carbon-based material is a wood-based carbon material. Other non-limitative examples of carbon-based materials include powdered carbon, granular carbon, or carbon pellets. In one embodiment, the adsorptive media 16 is activated carbon.

Generally, powdered carbon may have a size ranging between about 1 μm and about 100 μm, granular carbon may have a size ranging between about 100 μm and about 200 μm, and carbon pellets may have a size ranging between about 200 μm and about 3500 μm. A non-limitative example of carbon pellets has a size ranging between about 1780 μm and about 3310 μm.

Figure 4:
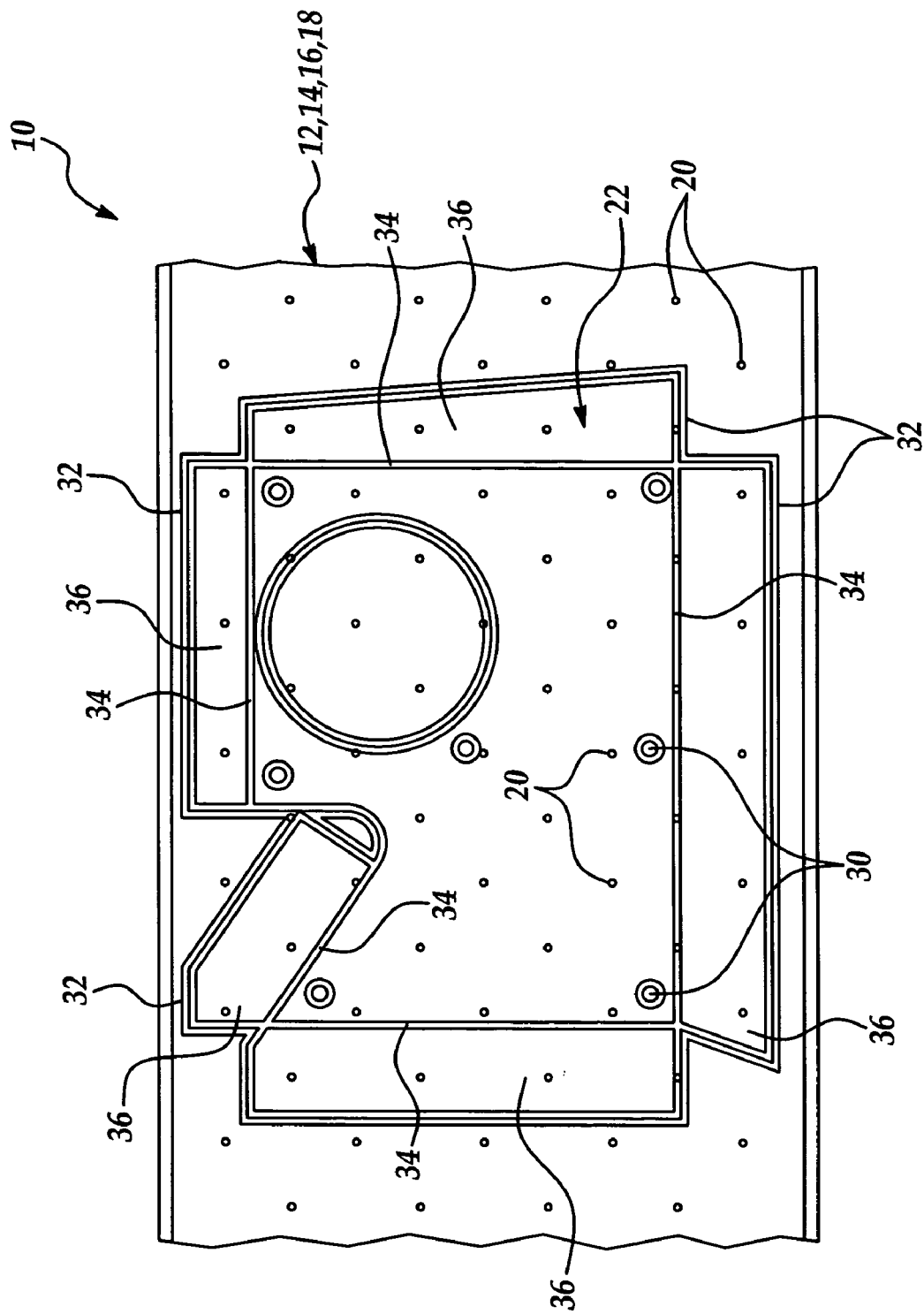
FIG. 4 is a partially schematic top view of an embodiment of the adsorptive filter.

Referring now to FIG. 2C, an embodiment of the adsorptive filter/member 10 after the plurality of fasteners 20 has been established is depicted. In an embodiment of the method, the stack of materials 12, 14, 16 may be fastened at predetermined locations across the outer surfaces 22, 24 of the first and second layers 12, 14 (as best seen in FIG. 4) via any suitable fastener, including but not limited to rivets, welds, and/or combinations thereof. Non-limitative examples of suitable welding techniques include sonic welding, such as sonic spot welding or seaming, vibration welding, hot upsetting (using resistance heating to heat materials to bond, like soldering), and/or laser welding.

It is to be understood that fastening may be initiated through the first layer 12, the second layer 14, or through both layers 12, 14. As depicted in FIG. 2C, the plurality of fasteners 20 extends from an outer surface 22 of the first layer 12 to an outer surface 24 of the second layer 14. In an embodiment in which the adsorptive media 16 covers substantially the entire surface area of the first and/or second layers 12, 14 prior to fastening, it is to be understood that the plurality of fasteners 20 may also extend through some of the adsorptive media 16.

The plurality of fasteners 20 subdivides the area 13 into a plurality of substantially enclosed chambers 27. It is to be understood that the enclosed chambers 27 contain most or substantially all of the adsorptive media 16 therein. It is believed that the plurality of chambers 27 also advantageously provides substantially even distribution of the adsorptive media 16 throughout the filter/member 10.

In an alternate embodiment of the method, the chambers 27 (and first and second chamber 26, 28 shown in FIGS. 3D and 3E) may be formed such that they are initially partially enclosed. In this embodiment, the area 13 (as shown in FIG. 2A without adsorptive media 16) is partially enclosed by establishing some of the plurality of fasteners 20. This alternate embodiment allows the adsorptive media 16 to be added to the partially enclosed (not shown) chambers, as opposed to the embodiment in which the adsorptive media 16 is in the enclosed chambers 27 upon formation of the chambers 27. After the adsorptive media 16 is added to substantially fill the partially enclosed chambers, then the chambers 27 are substantially enclosed via establishment of the remainder of the plurality of fasteners 20 (as depicted in FIGS. 2C and 2D).

In embodiment(s) of the method, a predetermined amount of the adsorptive media 16 is used. It is to be understood that a substantial amount of the adsorptive media 16 is contained within the enclosed chambers 27. The amount of adsorptive media 16 used may be dependant on, among other things, the amount of adsorbate to be adsorbed and the size of the adsorptive media 16. In an embodiment, the predetermined amount of the adsorptive media 16 used ranges between about 0.1 grams/square inch/side and about 1 gram/square inch/side. In a non-limitative example, one of the enclosed chambers 27 has about 0.35 grams of granular carbon adsorptive media 16 per square inch per side of the enclosed chamber 27.

It is to be understood that the predetermined amount of adsorptive media 16 may be substantially loose within the chambers 27 and does not include binders that may poison and/or otherwise deleteriously affect the media 16 surface area available for adsorption of the desired adsorbate. Without being bound to any theory, it is believed that the loose media 16 and the lack of binders may substantially increase and/or maintain the adsorptive capacity and/or efficiency of the adsorptive media 16 without increasing the amount of adsorptive media 16 disposed within filter/member 10.

In a comparative example, a filter including activated carbon impregnated filter media obtained from AQF Technologies LLC in Charlotte, N.C. is compared to an embodiment of filter 10. Both filters have substantially similar capacities for adsorption of the desired adsorbate. In order to have similar capacities, both filters would include the same amount of carbon having surface area available for adsorption. The filter containing the AQF carbon media contains about 2.9 grams of carbon per cubic inch of the filter; while an embodiment of the filter 10 contains about 4.7 grams of carbon per cubic inch of filter 10. As such, in order for the AQF filter to include as much carbon as the filter 10, it would have to be made larger. This increase in the size of the AQF comparative filter is due, at least in part, to the polymeric fibrous binders attached to the carbon used in the AQF carbon media.

Without being bound to any theory, it is believed that the enclosed chambers 27 are substantially small in size so that may contain substantially small amounts of adsorptive media 16. It is to be understood that a thin (small) layer of the adsorptive media 16 may maximize the surface area of the media 16 available for adsorption. The exposed surface area of the adsorptive media 16 is increased, thereby advantageously offering a greater probability of interaction between the desired adsorbate and the adsorptive media 16, rendering a greater probability of capture of the desired adsorbate in the adsorptive media 16. In a non-limitative example, the exposed surface area of the adsorptive media 16 ranges between about 30 square inches and about 200 square inches.

It is to be understood that the filter/member 10 may be of any suitable thickness. In a non-limitative embodiment, the filter 10 has a thickness of about 0.1875 inch (4,762.5 μm).

Referring now to FIG. 2D, an embodiment of the method includes forming a plurality of mounting throughbores 30 in the filter/member 10. It is to be understood that the mounting throughbores 30 may be adapted to assist in permanently securing the adsorptive filter 10 to an apparatus in which the filter 10 may be used (e.g. an automotive air induction system). In an alternate embodiment, the mounting throughbores 30 may be adapted to assist in releasably securing the adsorptive filter 10 to an apparatus in which the filter 10 may be used. In one non-limitative example, the throughbores 30 are adapted to receive attachment members 38 that are configured to mount the adsorptive filter 10 to a desired surface. In an alternate non-limitative example, the throughbores 30 are adapted to receive attachment members 38, for example, heat staking pins, that are configured to mount the adsorptive filter 10 a spaced distance from the desired surface. It is believed that this non-limitative example may increase the exposed surface area of the filter 10 by providing a second gaseous adsorbate flow path between the desired surface and in gaseous communication with one of the outer surfaces 22, 24 of the first and second layers 12, 14. The first gaseous adsorbate flow path is in gaseous communication with the other of the outer surfaces 24, 22 of the second and first layers 14, 12. It is to be understood that either the first layer 12 or the second layer 14 may face the desired surface.

Figure 3A:
FIG. 3A is a cross-sectional view showing first and second layers of polymeric materials.

Together, FIGS. 3A-3E depict a flow diagram of an embodiment of the method of forming an alternate embodiment of the adsorptive filter/member 10 (as depicted in FIGS. 3D and 3E).

Figure 3B:
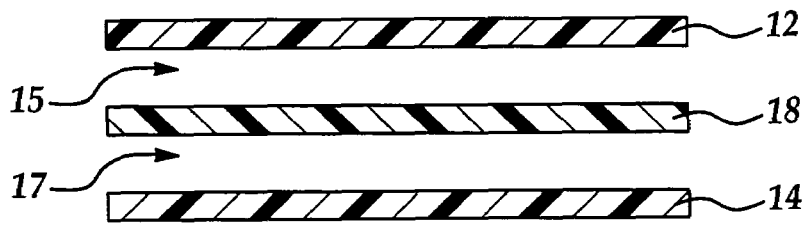
FIG. 3B is a cross-sectional view showing the intermediate layer between the first and second layers.

FIG. 3A illustrates the first and second layers 12, 14 a spaced distance apart. This embodiment of the method includes establishing an intermediate layer 18 of polymeric material between the first and second layers 12, 14, as depicted in FIG. 3B. In an embodiment, the intermediate layer 18 has a thickness ranging between about 0.0065 inch (165.1 μm) and about 0.0125 inch (317.5 μm). In a non-limitative example, the thickness of the intermediate layer 18 is about 0.0095 inch (241.3 μm). It is to be understood that the intermediate layer 18 may be the same, similar or different material(s) as the first and second layers 12, 14. The intermediate layer 18 may also be substantially permeable to the desired adsorbate while being substantially impermeable to the adsorptive media 16. In an embodiment, the intermediate layer 18 pore or mesh size may be substantially more permeable to the desired gaseous adsorbate than both the first and second layers 12, 14. In addition, the pore size of the intermediate layer 18 being larger than the pore size of the first and second layers 12, 14 may advantageously also provide substantially enhanced suspension for the adsorptive media 16 to substantially prevent the media from undesirably agglomerating within the filter/member 10. As such, the enhanced suspension may increase the available surface area of the adsorptive material 16 to adsorb the desired adsorbate. In an embodiment, pores size may range between about 200 μm and about 1000 μm. In a further non-limitative embodiment, the intermediate layer 18 pore size is between about 250 μm and about 350 μm. As with first and second layers 12, 14, it is desirable that the intermediate layer 18 polymeric material be chemically similar enough to the first and second layers 12, 14 so as to be fastened together, if such fastening is accomplished by other than a mechanical means.

As depicted in FIG. 3B, the addition of the intermediate layer 18 forms a first area 15 disposed between the first layer 12 and the intermediate layer 18 and also forms a second area 17 disposed between the intermediate layer 18 and the second layer 14. It is to be understood that the thickness of the first and second areas 15, 17 may be dependent on, among other factors, the positioning of the first layer 12, the second layer 14, and the intermediate layer 18. In an embodiment, the thicknesses of each of the first and second areas 15, 17 ranges between about 0.008 inch (203.2 µm) and about 0.12 inch (3,048 µm). In a specific non-limiting example, the thickness of each of the first and second areas 15, 17 ranges between about 0.02 inch (508 µm) and about 0.08 inch (2,032 µm).

Figure 3C:
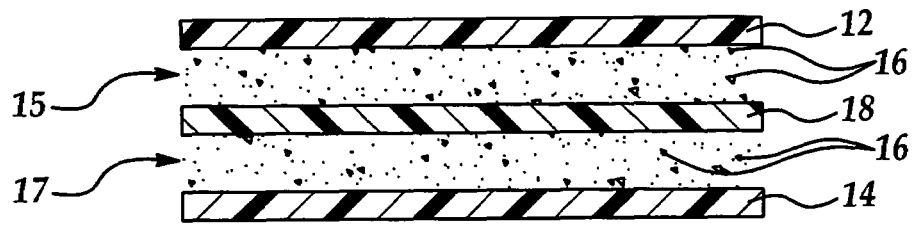
FIG. 3C is a cross-sectional view showing adsorptive media between the first layer and the intermediate layer and between the intermediate layer and the second layer.

Referring now to FIG. 3C, the first and second areas 15, 17 may be adapted to be filled with a predetermined amount of the previously mentioned adsorptive media 16. It is to be understood that factors may be taken into consideration when determining the thickness of the first and second areas 15, 17. Examples of the factors include, but are not limited to the amount of adsorbate that is to be adsorbed; the adsorptive capacity of the adsorptive media 16; the thickness and length of the areas 15, 17; the particle size of the adsorptive media 16; and the amount of adsorptive media 16 that is desired in the areas 15, 17 upon fastening of the filter/member 10 (see FIGS. 3D and 3E).

It is to be understood that the intermediate layer 18 may act as a divider such that substantially all of the adsorptive media 16 is not located in the same area of the filter/member 10. The addition of the intermediate layer 18 and the separation of the adsorptive media 16 may advantageously ease the fastening (e.g. welding) process, as each of the first and second layers 12, 14 may fasten to the intermediate layer 18. Such fastening would be through a portion of the thickness of the adsorptive media 16 to layer 18; whereas without intermediate layer 18, the fastening of layers 12, 14 would be through substantially the entire thickness of the adsorptive media 16. The intermediate layer 18 may also advantageously increase the rigidity of the filter/member 10 without additional parts and/or cost. It is further believed that such added rigidity aids in obviating the need for a frame to contain the filter/member 10. However, it is to be understood that if a frame is desired for a particular end use, the filter/member 10 may also advantageously be utilized within a frame (not shown).

FIGS. 3D and 3E depict the plurality of fasteners 20 subdividing each of the areas 15, 17 into a plurality of substantially enclosed first chambers 26 and substantially enclosed second chambers 28. It is to be understood that the enclosed first and second chambers 26, 28 contain most or substantially all of the adsorptive media 16 therein. It is believed that the plurality of chambers 26, 28, similar to chambers 27, also advantageously substantially evenly distributes the adsorptive media 16 throughout the filter 10.

Referring specifically to FIG. 3E, an embodiment of the method includes forming a plurality of mounting throughbores 30 in the filter 10 (as previously described in reference to FIG. 2D). As described, the mounting throughbores 30 may be adapted to assist in releasably securing or permanently securing the adsorptive filter 10 to an apparatus in which the filter 10 may be used (e.g. an automotive air induction system). The throughbores 30 may also be adapted to receive attachment members 38 that are configured to mount the adsorptive filter 10 to a desired surface or a spaced distance from the desired surface.

Embodiment(s) of the method disclosed herein may further include seam welding as desired. Further, the method may include die cutting the adsorptive filter/member 10 into a predetermined shape. It is to be understood that the filter 10 may be cut into any suitable size and/or shape as desired and/or preferred for a particular end use. FIG. 4 depicts a non-limiting example of a die cut shape that is suitable for the filter 10. In this figure, the lines 32 represent the die cut lines. It is to be understood that the size and/or shape of the cut of the filter 10 may be determined in part by the end use of the filter 10. For example, if the filter 10 is incorporated into an automobile air induction system, it is desirable that the shape of the filter 10 be cut to substantially fit the particular system. It is to be understood that the filter 10 may also be cut larger than the apparatus into which it will be placed. In this embodiment, the filter 10 may advantageously be folded and fastened into a size suitable for the apparatus in/on which the filter 10 will be used.

Further, the filter/member 10 may include selectively articulatable members 36 connected to the filter 10 by any suitable means, for example by a living hinge 34. Members 36 may advantageously allow filter 10 to substantially conform to the desired surface. Members 36 may advantageously be formed from layers 12, 14, 16, 18.

In an alternate embodiment of the method, the first layer 12, the second layer 14, and the intermediate layer 18 (when used) are cut into a predetermined shape prior to the positioning and the establishing of the materials. Thus, the layers 12, 14, 18 may be shaped prior to the formation of the filter 10, as opposed to an embodiment in which the filter 10 is formed and then cut to a desired shape.

As previously indicated, the filter/member 10 may be adapted for use in a variety of applications and/or apparatuses. In a non-limiting example, the filter 10 may be used in an automobile air induction system to trap hydrocarbon evaporative emissions. It is to be understood that after using the filter 10, it may be regenerated for reuse. Regeneration of the filter 10 may be accomplished by increased air flow, temperature swing adsorption (TSA), or pressure swing adsorption (PSA). In TSA, gas may be adsorbed in the adsorptive media 16 at a lower temperature and then may be desorbed from the adsorptive media when the temperature is raised. In PSA however, gas may be adsorbed in the adsorptive media 16 at higher pressures and then may be desorbed from the adsorptive media 16 at lower pressures.

In the embodiment(s) of the method disclosed herein, it is to be understood that each of the components 12, 14, 16 (and optionally 18) may be applied sequentially to form a stack of the materials that is fastened to form the adsorptive filter/member 10. For example, the second layer of polymeric material 14 may be positioned as a bottom layer; a layer of adsorptive media 16 may be established on the second layer 14; the intermediate layer 18 may optionally be established on the layer of adsorptive media 16; an additional layer of adsorptive media 16 may be established on the intermediate layer 18, if used; and the first layer of polymeric material 12 may be established on the layer (additional layer) of adsorptive media 16. The stack of materials/layers 12, 14, 16, and optionally 18 may then be fastened in predetermined places to form the adsorptive filter 10 having the plurality of substantially enclosed chambers 27, or first and second chambers 26, 28.

Embodiment(s) of the methods and adsorptive filters/members 10 offer many advantages, including, but not limited to the following. The amount of adsorptive media 16 used in the filter 10 may be decreased while advantageously increasing the adsorptive media's exposed surface area. Without being bound to any theory, it is believed that this characteristic may advantageously increase the probability of interaction with and subsequent capture of the desired adsorbate. Further, the adsorptive filter 10 may include an intermediate layer 18 that substantially prevents all of the adsorptive media 16 from being located in the same area of the filter 10, thereby advantageously aiding in fastening layers 12, 14 each to layer 18. Further, layer 18 may substantially increase the suspension for the adsorptive media 16, thereby advantageously increasing the available surface area of the adsorptive media 16. The intermediate layer 18 may also advantageously provide rigidity to the filter 10. Further, embodiments of the adsorptive filter 10 may advantageously have sufficient flexibility to ease installation of the filter 10 while maintaining sufficient rigidity to substantially obviate the need for a screen mesh and/or frame. This may advantageously reduce the need for additional materials, and thus may result in a decrease in manufacturing costs. Still further, embodiments of the filter 10 include loose adsorptive media 16 without the addition of binders, thus substantially increasing and/or maintaining the adsorptive capacity of the filter 10.

While preferred embodiments have been described in detail, it will be apparent to those skilled in the art that the disclosed embodiments may be modified. Therefore, the foregoing description is to be considered exemplary rather than limiting.

What is claimed is:

1. An adsorptive filter for adsorbing a desired gaseous adsorbate, comprising:
    a first layer of a flexible polymeric material having an outer surface;
    a second layer of a flexible polymeric material spaced from the first layer to form an area between the first and second layers, the second layer having an outer surface;
    a plurality of fasteners located at predetermined areas across the first and second layer outer surfaces, the plurality of fasteners extending from the outer surface of the first layer to the outer surface of the second layer, wherein the plurality of fasteners subdivides the area into a plurality of substantially enclosed chambers;
    a predetermined amount of adsorptive media disposed within each of the plurality of substantially enclosed chambers, the plurality of substantially enclosed chambers adapted to substantially evenly distribute the adsorptive media throughout the filter;
    a plurality of throughbores extending from the outer surface of the first layer to the outer surface of the second layer, and adapted to receive attachment members for mounting the filter to a desired surface, the plurality of throughbores located on the attachment members and the plurality of throughbores being formed from a spot weld of a portion of the first layer to a portion of the second layer; and
    a gaseous adsorbate flow path in gaseous communication with one of the outer surfaces of the first and second layers;
    wherein each of the first and second layer polymeric materials include pores that are permeable to the desired gaseous adsorbate, and wherein each of the first and second layer polymeric materials pores are substantially impermeable to the adsorptive media.

2. The adsorptive filter as defined in claim 1 wherein the attachment members are configured to mount the adsorptive filter a spaced distance from the desired surface, thereby forming a second gaseous adsorbate flow path between the desired surface and the other of the outer surfaces of the first and second layers.

3. The adsorptive filter as defined in claim 1 wherein the adsorptive media comprises at least one of a carbon based material, zeolites, aluminum silicates, silica gels, cyclodextrins, silicone, and mixtures thereof.

4. The adsorptive filter as defined in claim 3 wherein the carbon based material comprises particles of granular carbon, the particles having a size ranging between about 100 µm and about 200 µm.

5. The adsorptive filter as defined in claim 1 wherein the predetermined amount of adsorptive media ranges between about 0.1 grams per square inch per side of the substantially enclosed chamber and about 1 gram per square inch per side of the substantially enclosed chamber.

6. The adsorptive filter as defined in claim 1 further comprising an intermediate layer of a flexible polymeric material disposed between the first and second layers to form a first area disposed between the first layer and the intermediate layer, and a second area disposed between the intermediate layer and the second layer, and wherein the plurality of fasteners subdivides each of the first and second areas into a plurality of substantially enclosed first chambers and substantially enclosed second chambers, the plurality of first and second chambers adapted to receive the adsorptive media.

7. The adsorptive filter as defined in claim 6 wherein the intermediate layer is adapted to add rigidity to the filter.

8. The adsorptive filter as defined in claim 6 wherein the intermediate layer is permeable to the desired adsorbate and is substantially impermeable to the adsorptive media.

9. The adsorptive filter as defined in claim 1 wherein the adsorptive media has an exposed surface area ranging between about 30 square inches and about 200 square inches.

10. The adsorptive filter as defined in claim 1 wherein at least one of the first layer of polymeric material and the second layer of polymeric material layer of polymeric material comprises at least one of polyesters, polypropylenes, vinyl copolymers, polycarbonate, acetal, polyvinyl chloride, polyamides, and mixtures thereof.

11. The adsorptive filter as defined in claim 1 wherein the plurality of fasteners comprises at least one of rivets and welds.

12. The adsorptive filter as defined in claim 11 wherein the welds are at least one of sonic welds, vibration welds, hot upsetting welds, and laser welds.

13. The adsorptive filter as defined in claim 1 wherein the gaseous adsorbate comprises hydrocarbon vapors.

14. The adsorptive filter as defined in claim 1 wherein the filter is adapted to be regenerated for repeated use.

15. The adsorptive filter as defined in claim 14 wherein regeneration of the filter is accomplished by at least one of increased air flow, temperature swing adsorption, and pressure swing adsorption.

16. The adsorptive filter as defined in claim 1 wherein the filter is adapted for use in a vehicle air induction system.

17. The adsorptive filter as defined in claim 1 wherein the filter further comprises at least one selectively articulatable member adapted to substantially conform the filter relative to the desired surface.

18. The adsorptive filter as defined in claim 1 wherein the attachment members are heat staking pins.

19. The adsorptive filter as defined in claim 1 wherein the filter is a frameless adsorptive filter.

20. An adsorptive filter for adsorbing hydrocarbon vapor, comprising:
    a first layer of a flexible, woven polymeric material having an outer surface;

a second layer of a flexible, woven polymeric material spaced from the first layer, the second layer having an outer surface;

an intermediate layer of a flexible polymeric, woven material disposed between the first and second layers to form a first area disposed between the first layer and the intermediate layer, and a second area disposed between the intermediate layer and the second layer;

a plurality of spot welds located at predetermined areas across the first and second layer outer surfaces, the plurality of spot welds extending from the outer surface of the first layer, through the intermediate layer, to the outer surface of the second layer, wherein the plurality of spot welds subdivides each of the first area and second area into a plurality of substantially enclosed first chambers and substantially enclosed second chambers, the plurality of first and second chambers adapted to add rigidity to the filter;

a predetermined amount of adsorptive media disposed within each of the plurality of substantially enclosed first and second chambers;

a hydrocarbon vapor flow path in gaseous communication with one of the outer surfaces of the first and second layers; and means for mounting the filter to a desired surface, the means for mounting engaging openings in the plurality of spot welds, wherein the mounting means is configured to mount the adsorptive filter a spaced distance from the desired surface, thereby forming a second hydrocarbon vapor flow path between the desired surface and the other of the outer surfaces of the first and second layers;

wherein each of the first and second layer polymeric materials includes pores that are permeable to the hydrocarbon vapor, and wherein each of the first and second layer polymeric materials pores are substantially impermeable to the adsorptive media.

21. The adsorptive filter as defined in claim 20 wherein the filter further comprises at least one selectively articulatable member adapted to substantially conform the filter relative to the desired surface.

* * * * *